(12) United States Patent
Erdman

(10) Patent No.: US 10,272,717 B1
(45) Date of Patent: Apr. 30, 2019

(54) ROBUST CENTER PIVOT IRRIGATION WHEELS SYSTEMS AND METHODS

(71) Applicant: Travis Erdman, Lyman, NE (US)

(72) Inventor: Travis Erdman, Lyman, NE (US)

( * ) Notice: Subject to any disclaimer, the term of this patent is extended or adjusted under 35 U.S.C. 154(b) by 133 days.

(21) Appl. No.: 15/356,044

(22) Filed: Nov. 18, 2016

Related U.S. Application Data

(60) Provisional application No. 62/257,035, filed on Nov. 18, 2015.

(51) Int. Cl.
| | |
|---|---|
| *B60C 7/26* | (2006.01) |
| *B60B 15/00* | (2006.01) |
| *B60C 7/06* | (2006.01) |
| *B60C 7/08* | (2006.01) |
| *A01G 25/09* | (2006.01) |

(52) U.S. Cl.
CPC ............ *B60B 15/00* (2013.01); *A01G 25/092* (2013.01); *B60C 7/06* (2013.01); *B60C 7/08* (2013.01); *B60B 2360/10* (2013.01); *B60B 2900/325* (2013.01); *B60B 2900/351* (2013.01); *B60Y 2200/224* (2013.01)

(58) Field of Classification Search
CPC ............ B60B 15/00; B60B 2360/10; B60B 2900/325; B60B 2900/351; A01G 25/092; B60C 7/08; B60C 7/06; B60Y 2200/224

USPC ..................................... 301/43, 44.3, 52
See application file for complete search history.

(56) References Cited

U.S. PATENT DOCUMENTS

| | | | | |
|---|---|---|---|---|
| 1,284,385 | A | * 11/1918 | Linden | B60B 15/02 |
| | | | | 301/43 |
| 1,387,225 | A | * 8/1921 | Allen | B60B 15/00 |
| | | | | 301/44.3 |
| 5,046,785 | A | 9/1991 | Bockerman | |
| 5,451,001 | A | 9/1995 | Kumm | |
| 5,810,452 | A | * 9/1998 | Hawthorne | B60B 15/02 |
| | | | | 301/43 |
| 7,775,610 | B2 | 8/2010 | Mettenbrink | |
| 8,657,215 | B1 | 2/2014 | Blum | |
| 2011/0121090 | A1* | 5/2011 | Price | A01G 25/092 |
| | | | | 239/1 |

* cited by examiner

*Primary Examiner* — S. Joseph Morano
*Assistant Examiner* — Jean W Charleston
(74) *Attorney, Agent, or Firm* — Santangelo Law Offices, P.C.

(57) ABSTRACT

The present invention is related to durable, increased traction irrigation wheel systems and method of increasing traction and durability of an irrigation wheel. A segmented, fully enclosed, circular rotating drum may be provided with may be configured to rotate around a central axis. A system may have integrally placed flat sheets on a periphery of a segmented, fully enclosed, circular rotating drum, at least one traction projection, and perhaps even at least one influential traction enablement component.

14 Claims, 5 Drawing Sheets

US 10,272,717 B1

ROBUST CENTER PIVOT IRRIGATION WHEELS SYSTEMS AND METHODS

This application is a U.S. Non-Provisional patent application claiming priority to and the benefit of U.S. Provisional Application No. 62/257,035 filed Nov. 18, 2015, hereby incorporated by reference herein.

BACKGROUND

Irrigation systems and other machines may desire one or more wheels for use in terrain. In the past, some of these wheels can get stuck in the ground, terrain, or the like. Embodiments of the present invention address these problems.

SUMMARY OF THE INVENTION

The present invention provides systems and methods for robust center pivot irrigation wheels. In embodiments, wheels may be used with any other kind of systems and methods and are not limited to irrigation systems.

It is therefore broadly an object of the present invention to provide improved methods and apparatus for wheels, such as but not limited to wheels for irrigation systems, even center pivot irrigation systems.

Another object of the present invention may include, in embodiments, at least one traction enhancement element that may be used with a wheel system.

Yet another object of the present invention may include, in embodiments, robust wheels that can endure use in various weather, soils, and the like.

Naturally, further objects, goals and embodiments of the invention are disclosed throughout other areas of the specification, claims, and figures.

BRIEF DESCRIPTION OF THE DRAWINGS

The following descriptions and referenced drawings are for selected embodiments of the present invention. Naturally, changes may be made to the disclosed embodiments while still falling within the scope and spirit of the present invention and the patent granted to its inventors.

DETAILED DESCRIPTION OF THE PREFERRED EMBODIMENTS

Figure 1:
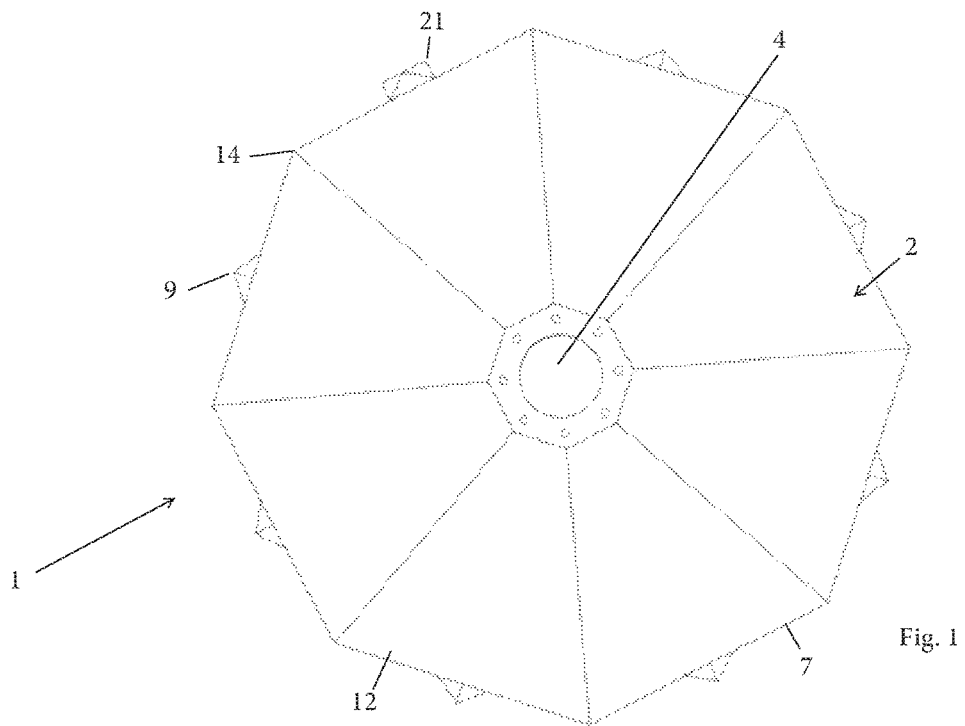
FIG. 1 is a front view of an embodiment of the present invention showing an example of durable, increased traction irrigation wheel.

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Embodiments of the present invention include a durable, increased traction irrigation wheel (1) comprising a segmented, fully enclosed, circular rotating drum (2) configured to rotate around a central axis (3); a center axis attachment section (4) configured to connect to an irrigation system (6), such as an axle (5) of an irrigation system; wherein said segmented, fully enclosed, circular rotating drum (2) comprises a plurality of integrally placed flat sheets (7) on a periphery (8) of said segmented, fully enclosed, circular rotating drum; at least one traction projection (9) extending on each of said flat sheets; and perhaps even at least one influential traction enablement component (10) configured to attach to at least one of said flat sheets on said periphery of said segmented, fully enclosed, circular rotating drum. Embodiments of the present invention may provide a method of increasing traction and durability of an irrigation wheel comprising the steps of: providing a segmented, fully enclosed, circular rotating drum (2); attaching at least one of said segmented, fully enclosed, circular rotating drum to an axle (6) of an irrigation system; rotating said segmented, fully enclosed, circular rotating drum (2) about a central axis (3); as said drum rotates, contacting a ground (11) with a plurality of integrally placed flat sheets (7) on a periphery (8) of said segmented, fully enclosed, circular rotating drum; as said drum rotates, contacting said ground (11) with at least one traction projection (9) extending from said flat sheets; influencing traction of said rotating drum by inserting at least one traction enablement component (10) into said traction projection; rotating said segmented, fully enclosed, circular rotating drum (2) with said inserted traction enablement component (10); and perhaps even drawing said segmented, fully enclosed, circular rotating drum (2) from said ground (11).

Figure 2:
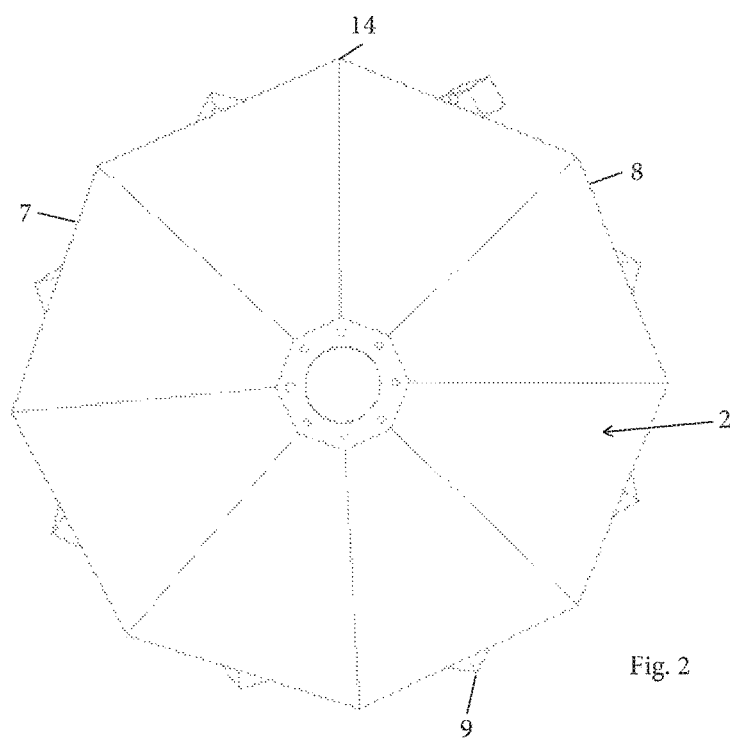
FIG. 2 is a back view of an embodiment of the present invention showing an example of durable, increased traction irrigation wheel.
Figure 3:
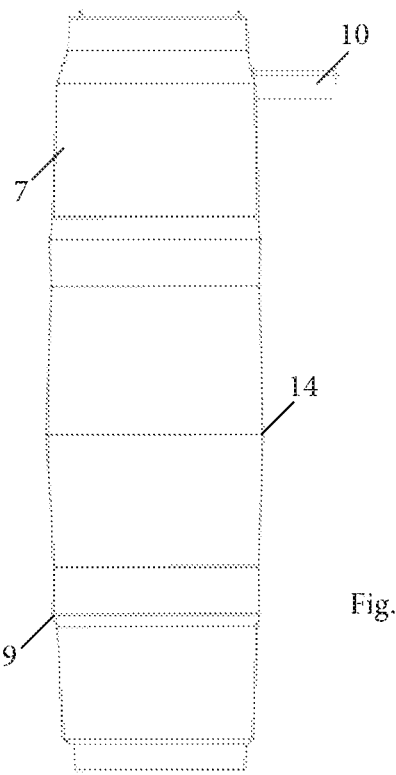
FIG. 3 is an end view of an embodiment of the present invention showing an example of durable, increased traction irrigation wheel.
Figure 4:
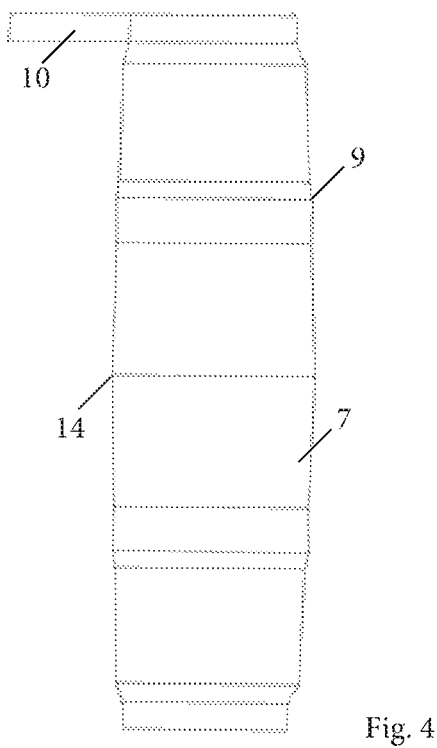
FIG. 4 is an opposite end view from FIG. 3 of an embodiment of the present invention showing an example of durable, increased traction irrigation wheel.
Figure 5:
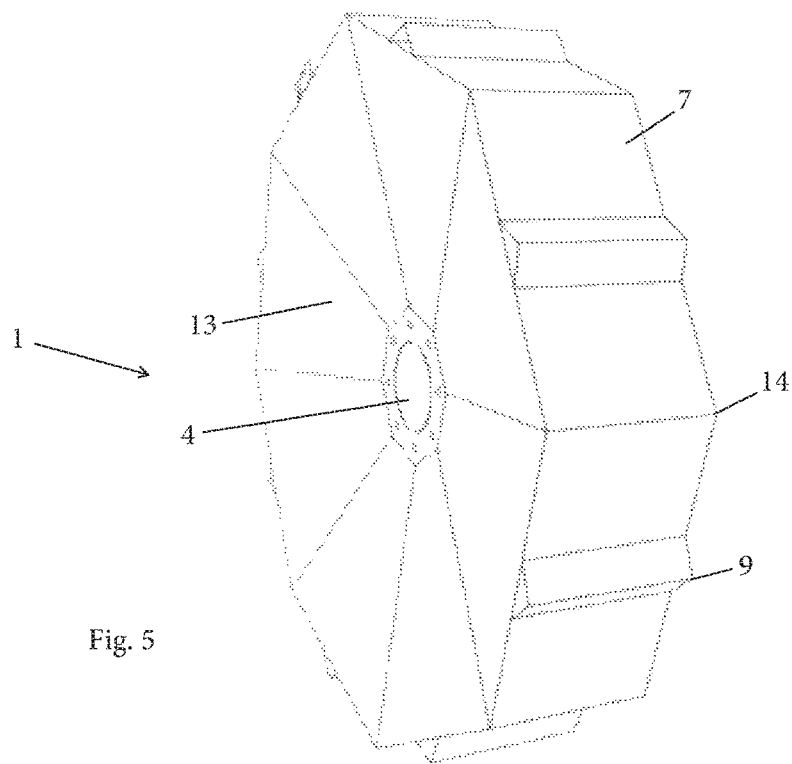
FIG. 5 is a perspective view of an embodiment of the present invention showing an example of durable, increased traction irrigation wheel.
Figure 6:
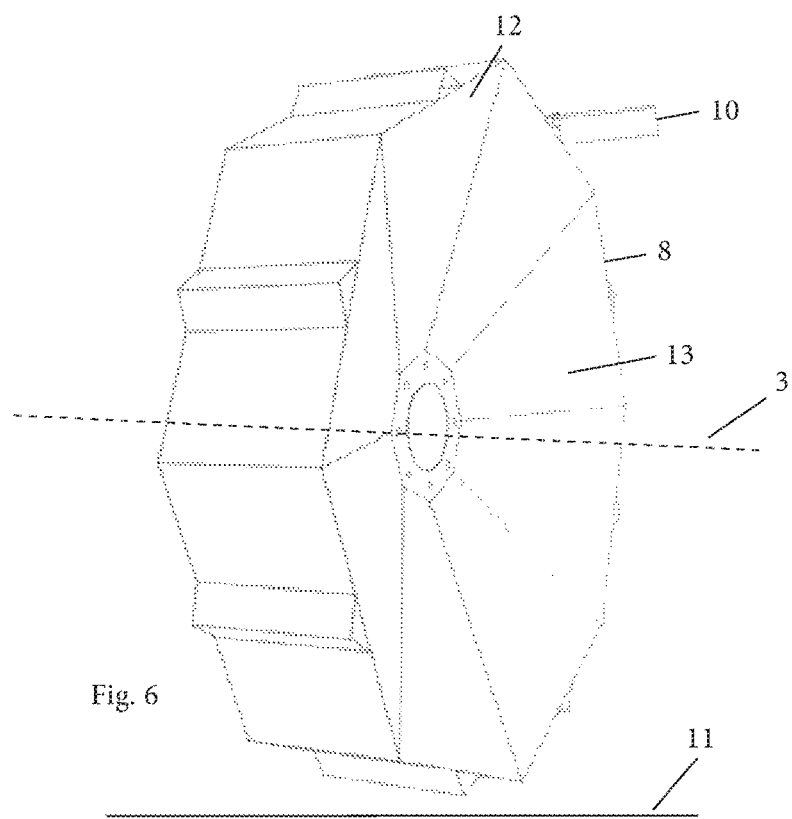
FIG. 6 is an opposite perspective view from FIG. 4 of an embodiment of the present invention showing an example of durable, increased traction irrigation wheel.

An irrigation system may be a center pivot irrigation system. In some embodiments, a drum may be attached to any kind of system or machine. A fully enclosed drum may be a drum that has no openings. As shown in FIGS. 1 and 2, In embodiments, a drum may include a plurality of hollow enclosed sections (12). A drum may be made of a metal material such as galvanized . . . . The entire wheel may be made of metal. In embodiments, the hollow enclosed sections may be arranged to create a circular rotating drum. There may be 8 integral sections, at least 3 sections; at least 4 sections; at least 5 sections; at least 6 sections; at least 7 sections; at least 8 sections; at least 9 sections, at least 10 sections; at least 11 sections, and at least 12 sections arranged to create a circular rotating drum, or the like. FIG. 5 shows an example of an 8 section drum. Of course, any number of sections may be used. An enclosed section may be a section that has no openings. In embodiments, a hollow enclosed section may be a tapered hollow enclosed section (13) such as may be understood from the example in FIGS. 5 and 6. In other embodiments, sections or even a drum may be solid. As may be understood in the examples in FIGS. 3 and 4, flat sheets may be integrally placed in a periphery of a drum. In some embodiments, there may be about 8 flat sheets around the periphery of a drum. At the juncture between each of the integrally placed flat sheets, there may be a traction point (14). Therefore, in some embodiments, a system may have a plurality of traction points. For example there may be at least 8 traction points, at least 3 traction points, at least 4 traction points, at least 5 tractions points, or more.

Figure 7:
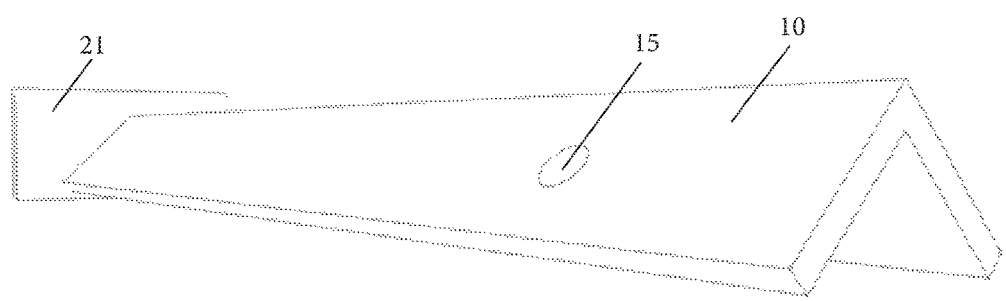
FIG. 7 is an example of an influential traction enablement component in accordance with embodiments of the present invention.
Figure 8:
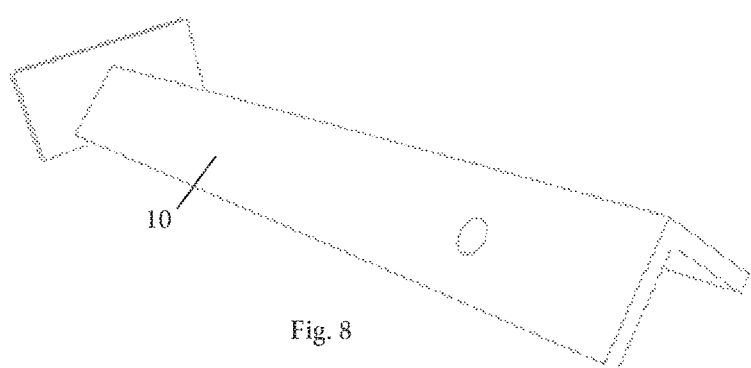
FIG. 8 is another example of an influential traction enablement component in accordance with embodiments of the present invention.

On the flat sheet, there may exist at least one traction projection (9). These may be a hollow traction projection. A traction enablement component (10) may be an elongated insert. It may be configured to slide into a traction projection and may even be locked to a traction projection perhaps with a lock (15). A traction projection may be a triangular shape, such as shown in FIGS. 7 and 8 or may be circular shaped or the like in other embodiments.

Figure 9:
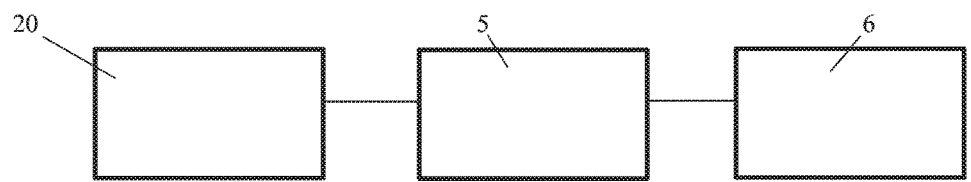
FIG. 9 is schematic figure of a wheel attached to an irrigation system in accordance with embodiments of the present invention.

A drum (20) may be attached to an irrigation system (6) perhaps an axle (5) of an irrigation system such as represented in FIG. 9. Attachment may be direct or even indirect attachment.

The present invention may provide, in embodiments, a wheel structure fabricated to be received by an axle of a center pivot irrigation system or any other system. As discussed, a traction enablement component may be provided perhaps for additional traction in assisting a wheel in certain terrain or even if it becomes stuck in terrain. This may include metal inserts, which may be optional for assisting a stuck pivot. In some embodiments, a wheel structure may be fabricated of about ⅛" (or any other size) steel that may be galvanized or even painted. Of course, other thicknesses may be utilized as well as other types of material such as but not limited to aluminum, stainless steel, mild steel, plastic, or the like. The overall structure may have an octagonal shape perhaps with a center axis attachment section perhaps being round. On each side of a center axis attachment section there may be about eight segmented hollow enclosed sections that may radiate off a center axis attachment section that may make perhaps an octagon shape. Of course, the amount of sections and shape that may be created can vary, e.g., use of about 5 segments, about 6 segments, about 7 segments, more than about 8 segments, about 9 segments, more than 9 segments, or the like that may provide a pentagon shape, hexagon, heptagon, nonagon, decagon, etc., and the like. A flat sheet may be provided on an outer side of at least one section that may provide traction to the wheel assembly perhaps useful in rough, muddy terrain. An overall structure may be about 55"h×about 11"w wide, perhaps weighing about 225 lbs. An alternative size may include a height of about 42 inches, about 48 inches, about 53 inches, between about 40 and about 60 inches, less than about 60 inches, or the like. Widths may include about 11 inches, up to about 11 inches, greater than 10 inches, or the like. Of course, a wheel system may be any size and any weight which may be dependent on the system used and all sizes and weights are included in this disclosure.

In some embodiments, a wheel system may be circular in shape without any segments or perhaps even any flat sheets on its perimeter.

Embodiments of the present invention may provide sections that are three dimensional and may include about 5 perhaps even 6 sides. At least one of the sides may be tapered. When assembled, in some embodiments, the wheel may have a concave or even convex nature.

As mentioned, embodiments of the present invention may have a traction enablement component (10). For example, inserts, which may be metal, can be placed in at least one or more traction enablement component of the wheel to provide a way for the pivot to walk itself out of rough, muddy terrain when the pivot becomes stuck. FIGS. 2, 3, 4 and 6 shows an insert engaged with a traction enablement component (10). An insert may be about 19 inches long perhaps with a stop plate (21), such as but not limited to a solid metal plate on one end perhaps to prevent the insert from slipping, while the other end may have a locking element such as a lock which may include but is not limited to a bolt, screw or the like, perhaps to also prevent slippage. An insert may have a length between about 16 inches and about 20 inches, up to about 16 inches, greater than about 15 inches, between about 10 inches and about 24 inches, less than about 16 inches, or the like. Of course, any type of size may be used as well as different types of materials and all are included in this disclosure. In some embodiments, the inserts may be use temporarily such as while the pivot may need assistance when stuck. However, other embodiments may utilize a permanent insert. To draw a wheel through a ground terrain, such as an irrigation field, is to cause a wheel to move in a particular direction.

As can be easily understood from the foregoing, the basic concepts of the present invention may be embodied in a variety of ways. It involves both pivot wheel techniques as well as devices to accomplish the appropriate pivot wheel. In this application, the pivot wheel techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention.

A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of an "insert" should be understood to encompass disclosure of the act of "inserting"—whether explicitly discussed or not—and, conversely, were there effectively disclosure of the act of "inserting", such a disclosure should be understood to encompass disclosure of an "insert" and even a "means for inserting." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of references or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the pivot wheel devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

Example claims for the present invention may include: A system substantially as herein described with reference to any one or more of the Figures and Description.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A durable, increased traction irrigation wheel comprising:
    a segmented, fully enclosed, circular rotating drum configured to rotate around a central axis;
    a center axis attachment section configured to connect to an axle of an irrigation system;
    wherein said segmented, fully enclosed, circular rotating drum comprises a plurality of integrally placed flat sheets on a periphery of said segmented, fully enclosed, circular rotating drum;
    at least one traction projection extending on each of said flat sheets; and
    at least one influential traction enablement component configured to insert in said at least one traction projection extending on each of said flat sheets.

2. A durable, increased traction irrigation wheel according to claim 1 wherein said segmented, fully enclosed, circular rotating drum comprises a plurality of hollow enclosed sections.

3. A durable, increased traction irrigation wheel according to claim 2 wherein said plurality of hollow enclosed sections comprises 8 integral sections arranged to create a circular rotating drum.

4. A durable, increased traction irrigation wheel according to claim 2 wherein said plurality of hollow enclosed sections comprises a number of sections selected from a group consisting of: at least 3 sections; at least 4 sections; at least 5 sections; at least 6 sections; at least 7 sections; at least 8 sections; at least 9 sections, at least 10 sections; at least 11 sections, and at least 12 sections arranged to create a circular rotating drum.

5. A durable, increased traction irrigation wheel according to claim 2 wherein said plurality of hollow enclosed sections comprises tapered hollow enclosed sections.

6. A durable, increased traction irrigation wheel according to claim 1 wherein said segmented, fully enclosed, circular rotating drum comprises a metal segmented, fully enclosed, circular rotating drum.

7. A durable, increased traction irrigation wheel according to claim 1 wherein said plurality of flat sheets comprises 8 integrally placed flat sheets on said periphery of said segmented, fully enclosed, circular rotating drum.

8. A durable, increased traction irrigation wheel according to claim 1 and further comprising a plurality of traction points formed at the juncture between each of the integrally placed flat sheets on said periphery of said segmented, fully enclosed, circular rotating drum.

9. A durable, increased traction irrigation wheel according to claim 8 wherein said plurality of traction points comprise at least 8 traction points.

10. A durable, increased traction irrigation wheel according to claim 1 wherein said traction projection comprises a hollow traction projection.

11. A durable, increased traction irrigation wheel according to claim 1 wherein said influential traction enablement component comprises an elongated insert.

12. A durable, increased traction irrigation wheel according to claim 1 wherein said influential traction enablement component is configured to slide into said traction projection.

13. A durable, increased traction irrigation wheel according to claim 1 further comprising a lock for said influential traction enablement component attached to said traction projection.

14. A durable, increased traction irrigation wheel according to claim 1 wherein said traction projection has a triangular shape.

* * * * *